No. 742,550. PATENTED OCT. 27, 1903.
F. N. ZIMMERMAN.
NUT LOCK.
APPLICATION FILED JULY 2, 1903.
NO MODEL.
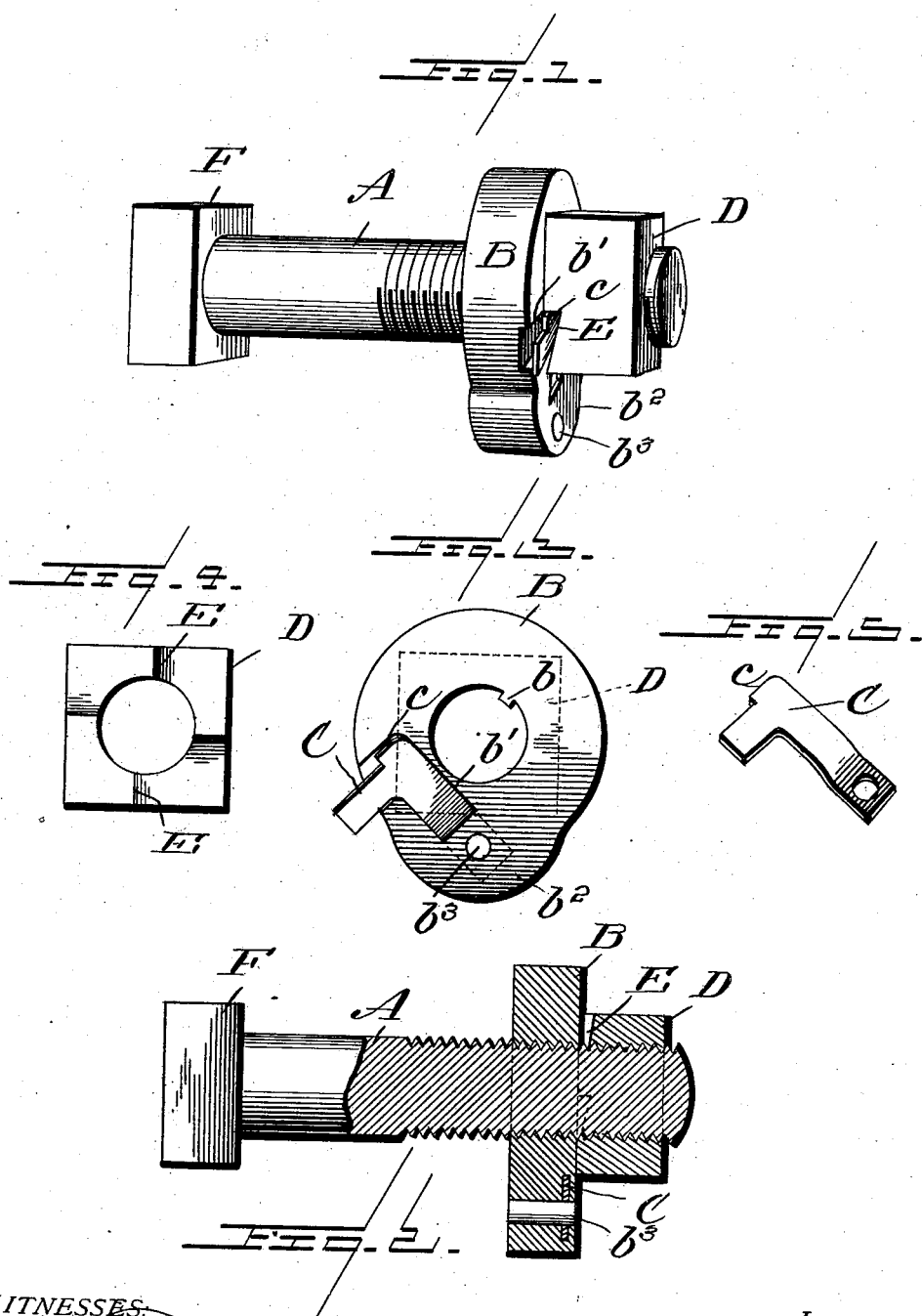
WITNESSES:
W. F. Doyle
G. Hilton
INVENTOR
Frank N. Zimmerman
BY Wm. H. Bates
Attorney No. 742,550.

Patented October 27, 1903.

UNITED STATES PATENT OFFICE.

FRANK N. ZIMMERMAN, OF FRIEDENS, PENNSYLVANIA.

NUT-LOCK.

SPECIFICATION forming part of Letters Patent No. 742,550, dated October 27, 1903.

Application filed July 2, 1903. Serial No. 163,997. (No model.)

*To all whom it may concern:*

Be it known that I, FRANK N. ZIMMERMAN, a citizen of the United States, residing at Friedens, in the county of Somerset and State of Pennsylvania, have invented new and useful Improvements in Nut-Locks, of which the following is a specification.

My invention relates to improvements in nut-locks; and the object of the invention is to provide a nut-lock of such construction as to combine simplicity and security from displacement or working loose of the operating parts.

To this end the invention consists in the construction and arrangement of parts, as will be hereinafter more in detail described and specifically claimed.

In the accompanying drawings, which fully illustrate my invention and to which reference is had, Figure 1 is a perspective view of my device. Fig. 2 is a longitudinal section of the same. Fig. 3 is a top or plan view, and Figs. 4 and 5 are details thereof.

Referring by letters to the drawings, A designates a screw-threaded bolt provided at its outer end with a washer B and a groove $b$, formed longitudinally therein, said washer having a right-angular recess $b'$ formed within its outer surface and a protuberance $B^2$ on its periphery, to which latter is secured in said recess one end of a right-angular locking-spring, which will be hereinafter explained.

C designates a right-angular locking-spring formed of a piece of flat metal and provided with an offset $c$, this spring corresponding to the recess formed in the washer, in which it is snugly seated and which serves—*i. e.*, the spring—by its engagement with the ratchets in the ratchet-nut to lock and hold the bolt and nut rigidly and securely together.

D designates a screw-threaded nut the threads of which mesh with corresponding threads upon the surface of the bolt A, the under side of said nut being provided with ratchet-teeth E, formed therein, in which the edge of the locking-spring engages, which, as previously stated, locks the parts rigidly and securely together when the nut is turned home against the washer, as clearly shown in Fig. 1 of the drawings.

F designates the ordinary head secured to the opposite end of the bolt A in the usual manner.

From the foregoing, taken in connection with the accompanying drawings, a further description of my device is herein deemed unnecessary.

Having thus described my invention, what I claim as new, and desire to secure by Letters Patent, is—

The combination with the bolt having a groove $b$, formed therein, a head F secured to the lower end of the bolt, and a ratchet-nut D secured to its opposite end; of a washer having a right-angular depression in its outer face, a lug formed integral with the washer in the periphery of the opening of the same which takes in the groove of the bolt, a right-angular locking-spring provided with an offset which engages the ratchets on the nut, said spring being seated in the depression, and secured to the washer by means of the protuberance formed upon the periphery of the washer at the point of pivotal connection of the spring, all operated as herein shown and described.

In testimony whereof I have signed my name to this specification in the presence of two subscribing witnesses.

FRANK N. ZIMMERMAN.

Witnesses:
WM. F. DOYLE,
WM. H. DELACY.